UNITED STATES PATENT OFFICE.

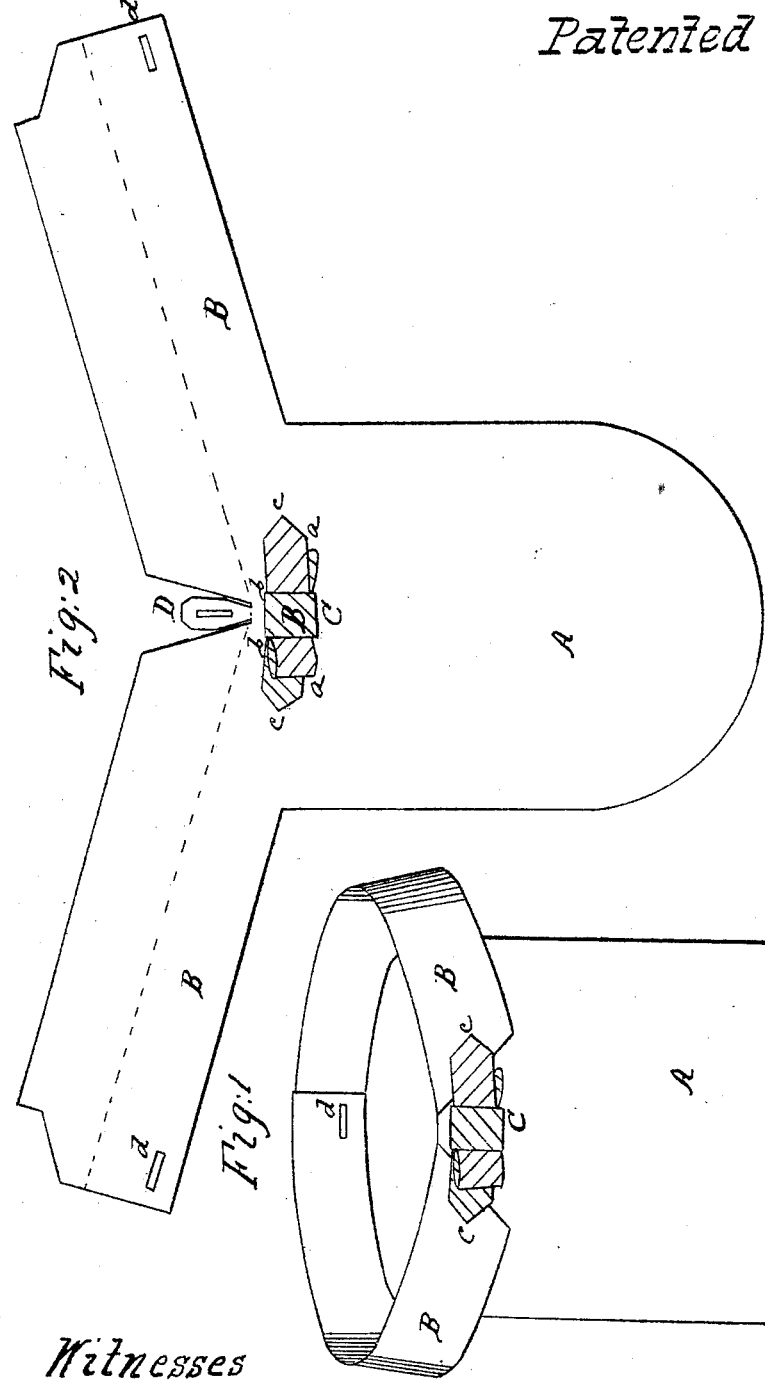

GEO. V. WOODS, OF BELCHERTOWN, MASSACHUSETTS, ASSIGNOR TO AUSTIN WHITE, OF SAME PLACE.

IMPROVEMENT IN NECK-TIES, COLLARS, AND BOSOMS COMBINED.

Specification forming part of Letters Patent No. 58,561, dated October 2, 1866.

*To all whom it may concern:*

Be it known that I, GEO. V. WOODS, of Belchertown, in the county of Hampshire and Commonwealth of Massachusetts, have invented certain new and useful Improvements in Combined Collars, Bosoms, and Neck-Ties; and I do hereby declare that the following is a full, clear, and exact description of the same, reference being had to the accompanying drawings, forming a part of this specification, in which—

Figure 1 represents a perspective view of a collar, bosom, and neck-tie made according to my invention as it appears when bent into the form which it is made to assume when applied to the neck of a person, and Fig. 2 represents the parts shown in Fig. 1 spread out to illustrate my invention more fully.

To enable those skilled in the art to which my invention belongs to make and use the same, I will proceed to describe it.

In the drawings, A represents the bosom, which may be of any desired form, and may be made plain, with plaits, or in any other desired manner. B represents the collar part, and C the neck-tie part.

The three parts named are made from a single piece of paper, or other suitable material, and are to be cut or stamped out with any suitable machinery.

The neck-tie part is set out or embossed, so as to have the appearance of a separate attachment, and may be colored or made to imitate any figure of cloth or other material. An illustration is shown in the drawings, in which the neck-tie part is made to represent striped material.

In stamping or forming the neck-tie the ends $c$ are cut or severed from the other parts of the material. In this instance they are cut or severed from $a$ to $b$ on each side, the line of separation being shown in red lines. One object of separating the end $c$ is to enable the ends of the collar to be folded down under the ends $c$, as shown in Fig. 1.

The piece D is so cut that it answers as a means of attachment to the shirt-button. It is turned back over when applied to the shirt, so that it is not exposed to view. (See Fig. 1.) The button of the shirt to which it is attached is just back of the neck-tie when in proper position on the neck of the wearer.

$d\ d$ are button-holes, by which the ends of the collar are fastened.

The neck-tie C and bosom A may be made in one piece, or the collar and neck-tie may be made in one piece—that is, the parts A and C may be made together without the part B, and the parts C and B may be made together without the part A. The form and figure of the parts may be made to suit the tastes of the manufacturer.

Having described my improvements in combined collars, bosoms, and neck-ties, what I claim as new and of my invention, and desire to secure by Letters Patent, is—

1. Making or forming a collar, bosom, and neck-tie from a single piece of paper, cloth, or other suitable material, substantially as set forth.

2. Making the part or neck-tie C, substantially as set forth.

3. Making the part or bosom A, and part or neck-tie C together, or from a single piece of material, substantially as set forth.

4. Making the collar or part B and neck-tie C together, or from a single piece of material, substantially as set forth.

5. The combination, with the ends C, of the collar B, substantially as shown in the drawings.

6. The piece D, in combination with the bosom and collar, or either, for the purposes set forth.

GEO. V. WOODS.

Witnesses:
FRANKLIN DICKINSON,
W. E. BRIDGMAN.